US009676243B2

(12) United States Patent
Fukatsu et al.

(10) Patent No.: US 9,676,243 B2
(45) Date of Patent: Jun. 13, 2017

(54) INDUSTRIAL VEHICLE

(71) Applicant: KABUSHIKI KAISHA TOYOTA JIDOSHOKKI, Kariya-shi, Aichi-ken (JP)

(72) Inventors: Fumihiro Fukatsu, Aichi-ken (JP); Takaaki Takenaka, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 0 days.

(21) Appl. No.: 15/014,391

(22) Filed: Feb. 3, 2016

(65) Prior Publication Data

US 2016/0221406 A1    Aug. 4, 2016

(30) Foreign Application Priority Data

Feb. 4, 2015    (JP) .................................. 2015-020138

(51) Int. Cl.
*B62D 49/08*    (2006.01)
*B60G 11/04*    (2006.01)
(Continued)

(52) U.S. Cl.
CPC ................ *B60G 11/04* (2013.01); *B60G 9/00* (2013.01); *B62D 49/007* (2013.01);
(Continued)

(58) Field of Classification Search
CPC ........ B60G 11/04; B62D 49/08; B62D 37/04; B62D 49/085
(Continued)

(56) References Cited

U.S. PATENT DOCUMENTS 2,256,314 A * 9/1941 Dunham ............. B66F 9/07509
180/54.1
4,671,535 A * 6/1987 Hanson .................. B60G 21/05
267/259
(Continued)

FOREIGN PATENT DOCUMENTS

EP          1462410 A1    9/2004
JP       2000-63095 A    2/2000
(Continued)

OTHER PUBLICATIONS

Communication dated Jun. 24, 2016 from the European Patent Office issued in corresponding Application No. 16152511.8.

*Primary Examiner* — Faye M Fleming
(74) *Attorney, Agent, or Firm* — Sughrue Mion, PLLC

(57) ABSTRACT

An industrial vehicle includes a frame, a counterweight that is connected to a rear part of the frame and a drive device that drives rear wheels. The drive device includes a drive device body and a pair of damping members that is mounted to the counterweight on right and left sides of the drive device body and allows relative motion between the counterweight and the rear wheels. The counterweight has a left mounting portion and a right mounting portion that are formed by machining. The left mounting portion and the right mounting portion have a first mounting hole and a second mounting hole, respectively, through which the respective damping members are mounted to the left mounting portion and the right mounting portion. The first mounting hole and the second mounting hole are formed coaxially with each other.

2 Claims, 9 Drawing Sheets

(51) Int. Cl.
    *B60G 9/00*         (2006.01)
    *B62D 49/06*       (2006.01)
    *B66F 9/075*       (2006.01)
    *B62D 49/00*       (2006.01)

(52) U.S. Cl.
    CPC ......... *B62D 49/0621* (2013.01); *B62D 49/08* (2013.01); *B62D 49/085* (2013.01); *B66F 9/07554* (2013.01); *B60G 2200/31* (2013.01); *B60G 2202/112* (2013.01); *B60G 2204/121* (2013.01); *B60G 2206/31* (2013.01); *B60G 2300/02* (2013.01); *B60G 2300/022* (2013.01)

(58) Field of Classification Search
    USPC ........................................ 280/755, 758, 759
    See application file for complete search history.

(56) References Cited

U.S. PATENT DOCUMENTS

| | | |
|---|---|---|
| 8,356,827 B2 | 1/2013 | Takeda |
| 2009/0039681 A1 | 2/2009 | Bogelein et al. |
| 2011/0108337 A1 | 5/2011 | Uno |

FOREIGN PATENT DOCUMENTS

| | | |
|---|---|---|
| JP | 2011-6192 A | 1/2011 |
| JP | 2011-098629 A | 5/2011 |

\* cited by examiner

INDUSTRIAL VEHICLE

BACKGROUND OF THE INVENTION

The present invention relates to an industrial vehicle.

Japanese Unexamined Patent Application Publication No. 2011-98629 discloses a towing tractor as a conventional industrial vehicle. The towing tractor includes a frame, a counterweight, and a drive device. The frame is disposed at a lower part of the towing tractor and extends in the longitudinal direction of the towing tractor. The counterweight is connected to a rear part of the frame. The drive device includes a drive device body including a traction motor and an axle shaft, and a pair of damping members that is provided at opposite lateral ends of the drive device body and capable of damping vibrations caused by traveling of the towing tractor.

In the towing tractor, the damping members are disposed at a lower part of the counterweight, which permits direct attachment of the drive device body to the counterweight. The structure in which the counterweight is adapted to function also as the rear frame helps to simplify the structure of the rear part of the towing tractor.

The counterweight for this type of industrial vehicles is generally formed by casting. Surface roughness or thermal shrinkage of the casting for the counterweight may cause irregularity in the mounting position where the damping members are fixed to the counterweight. In view of such circumstances, in the industrial vehicle of this type, mountings each having a mounting hole are welded to the counterweight at the opposite right and left sides thereof. Then, the damping members are mounted to the counterweight through the mounting holes of the respective mountings. This is a general way how the drive device is mounted to the counterweight.

In mounting of the drive device to the counterweight, the positions of the mounting holes of the mountings on the counterweight need to be determined highly accurately so that the drive device is mounted to the counterweight properly. In the above conventional industrial vehicle, however, it is difficult to weld the mountings to the counterweight accurately, which makes it difficult to manufacture the industrial vehicles.

The present invention, which has been made in view of the above problems, is directed to providing an industrial vehicle that enables mounting of the drive device to counterweight with high accuracy and is easy to manufacture.

SUMMARY OF THE INVENTION

In accordance with an aspect of the present invention, there is provided an industrial vehicle that includes a frame, a counterweight that is connected to a rear part of the frame and a drive device that drives rear wheels. The drive device includes a drive device body and a pair of damping members that is mounted to the counterweight on right and left sides of the drive device body and allows relative motion between the counterweight and the rear wheels. The counterweight has a left mounting portion and a right mounting portion that are formed by machining. The left mounting portion and the right mounting portion have a first mounting hole and a second mounting hole, respectively, through which the respective damping members are mounted to the left mounting portion and the right mounting portion. The first mounting hole and the second mounting hole are formed coaxially with each other.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe an embodiment of the present invention with reference to the accompanying drawings. The following description will deal with a towing tractor as an example of the industrial vehicle.

Figure 1:
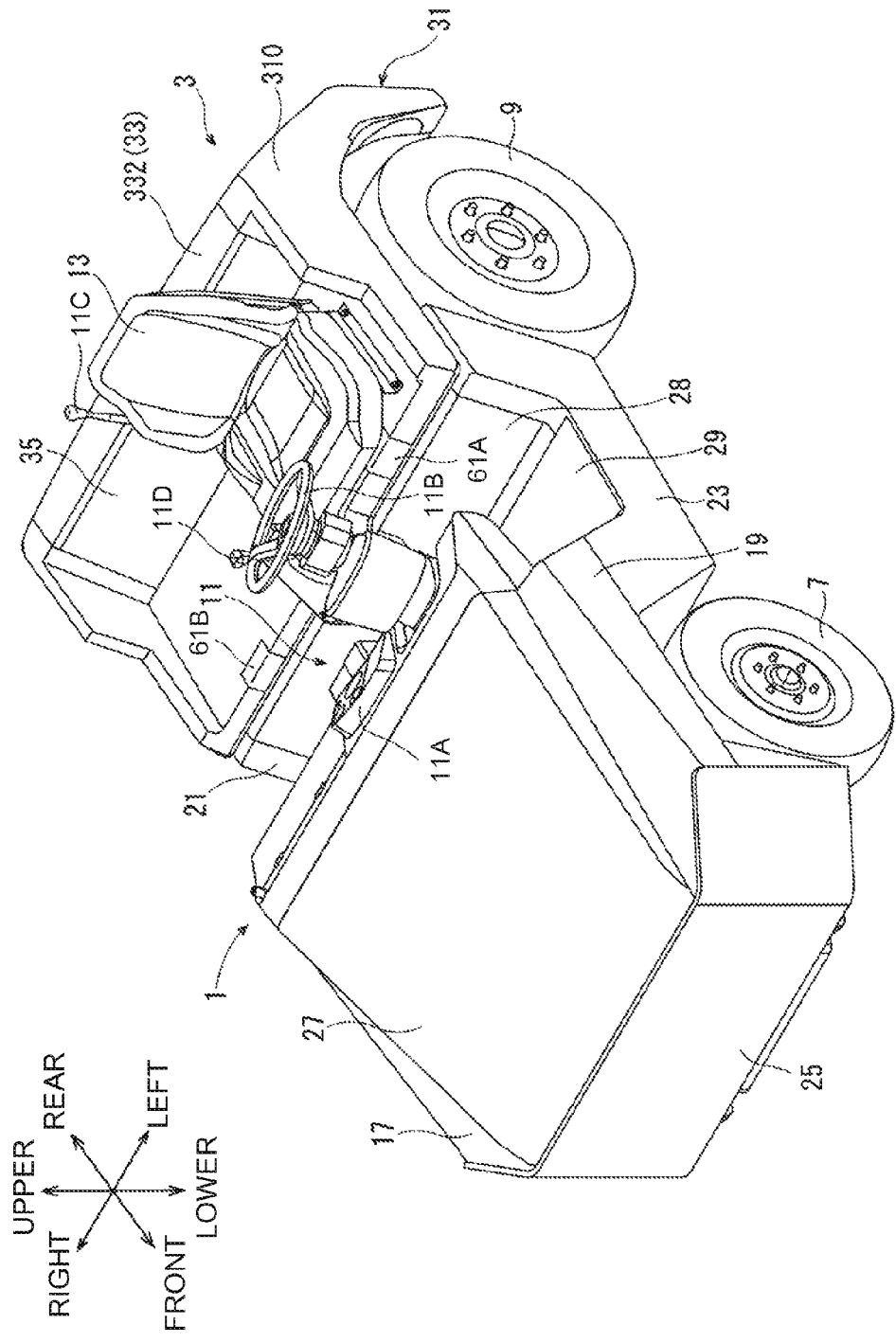
FIG. 1 is a perspective view of an industrial vehicle according an embodiment of the present invention.
Figure 2:
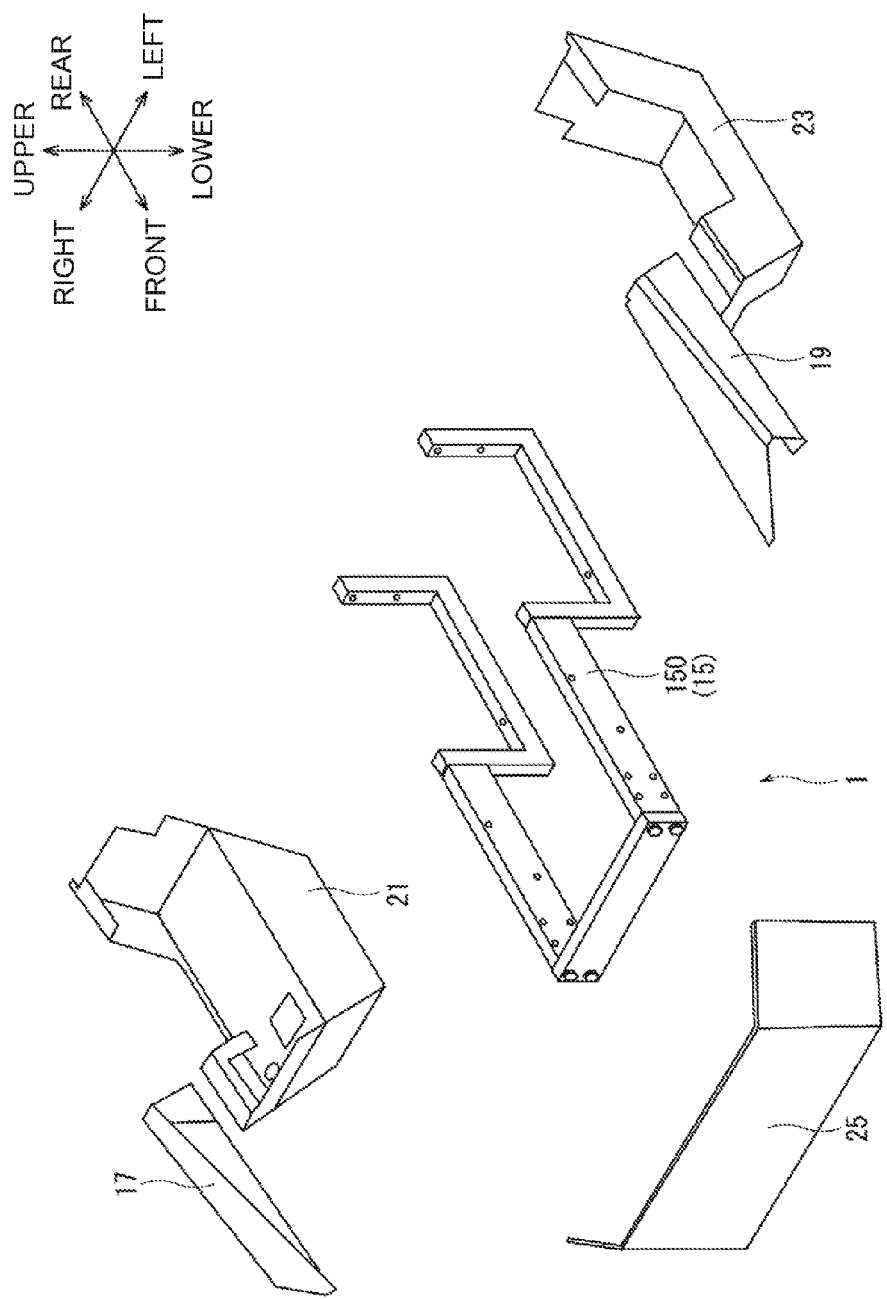
FIG. 2 is an exploded schematic view showing a frame body, right and left fender panels and other parts of the industrial vehicle of FIG. 1.
Figure 3:
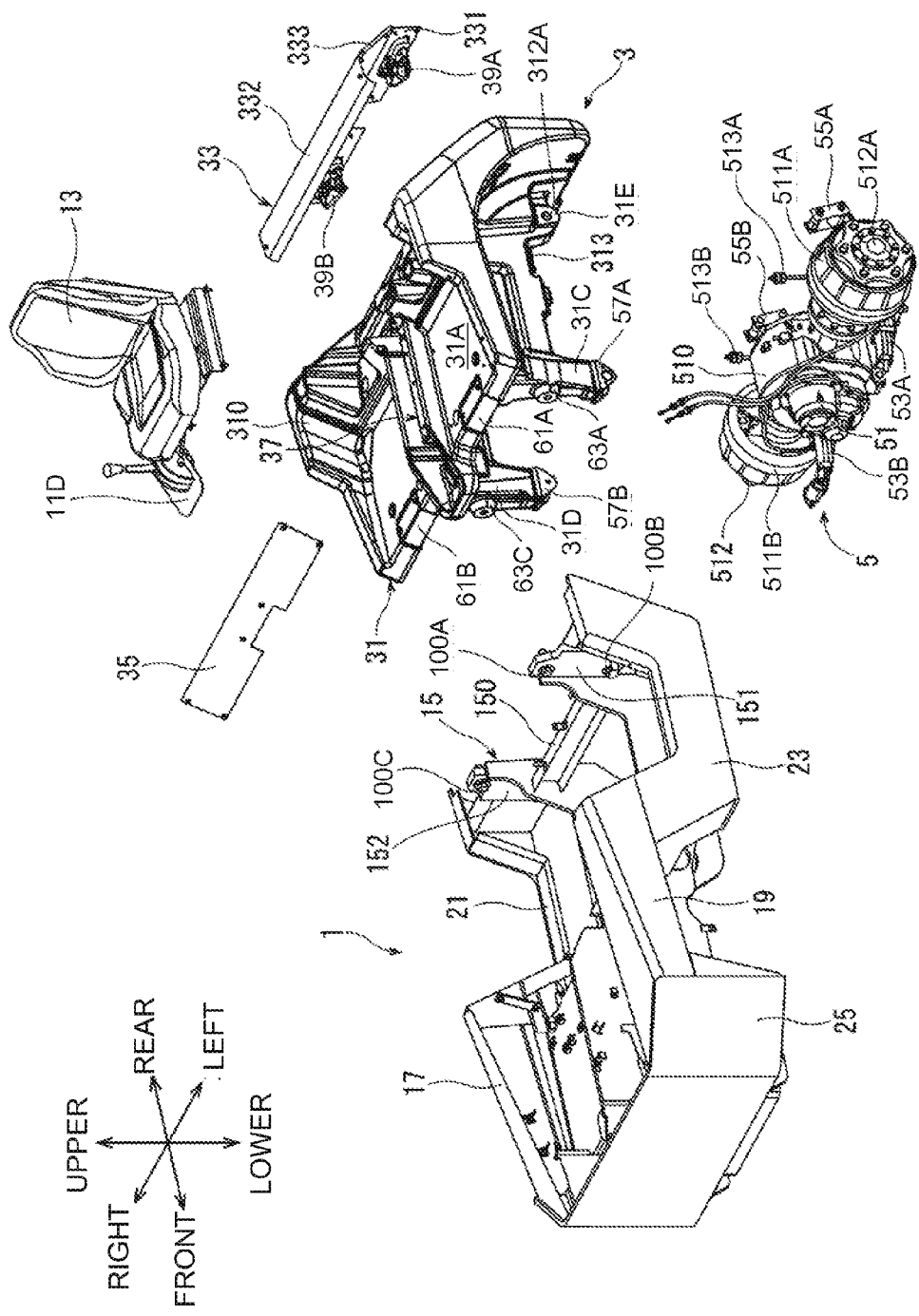
FIG. 3 is an exploded perspective view of the industrial vehicle of FIG. 1.

Referring to FIGS. 1 to 3, the towing tractor according to the present embodiment includes a vehicle body 1, a counterweight 3, a drive device 5, a pair of front wheels 7 (only one wheel being shown), a pair of rear wheels 9 (only one wheel being shown), an operation unit 11, and a seat 13. In FIG. 1, three double-headed arrows at the upper left corner of the drawing represent three different directions associated with the vehicle body 1 of the towing tractor. Namely, front and rear represent the longitudinal direction, the right and left represent the width direction, and upper and lower represent the vertical direction of the towing tractor vehicle body 1, respectively. The same is true of the other drawings.

The vehicle body 1 includes a frame 15 (FIG. 4), a right fender panel 17, a left fender panel 19, a fuel tank 21, a side panel 23, a front guard 25, a hood 27 (FIG. 1), a center panel 28, a floor panel 29, the aforementioned front wheels 7, an engine (not shown), and a transmission (not shown).

The frame 15 includes a frame body 150 (see FIG. 2), a left vertical wall 151 (FIG. 4), and a right vertical wall 152. As shown in FIG. 2, the frame body 150 is formed by connecting or joining a plurality of elongated steel members into a framework extending in the longitudinal direction of the towing tractor. The frame body 150 is disposed at a lower position of the vehicle body 1. The engine and the transmission are supported by the frame body 150. It is to be noted that a motor may be used as an alternative to the engine. In FIG. 2, the illustration of the frame body 150 is simplified for ease of the explanation.

Figure 4:
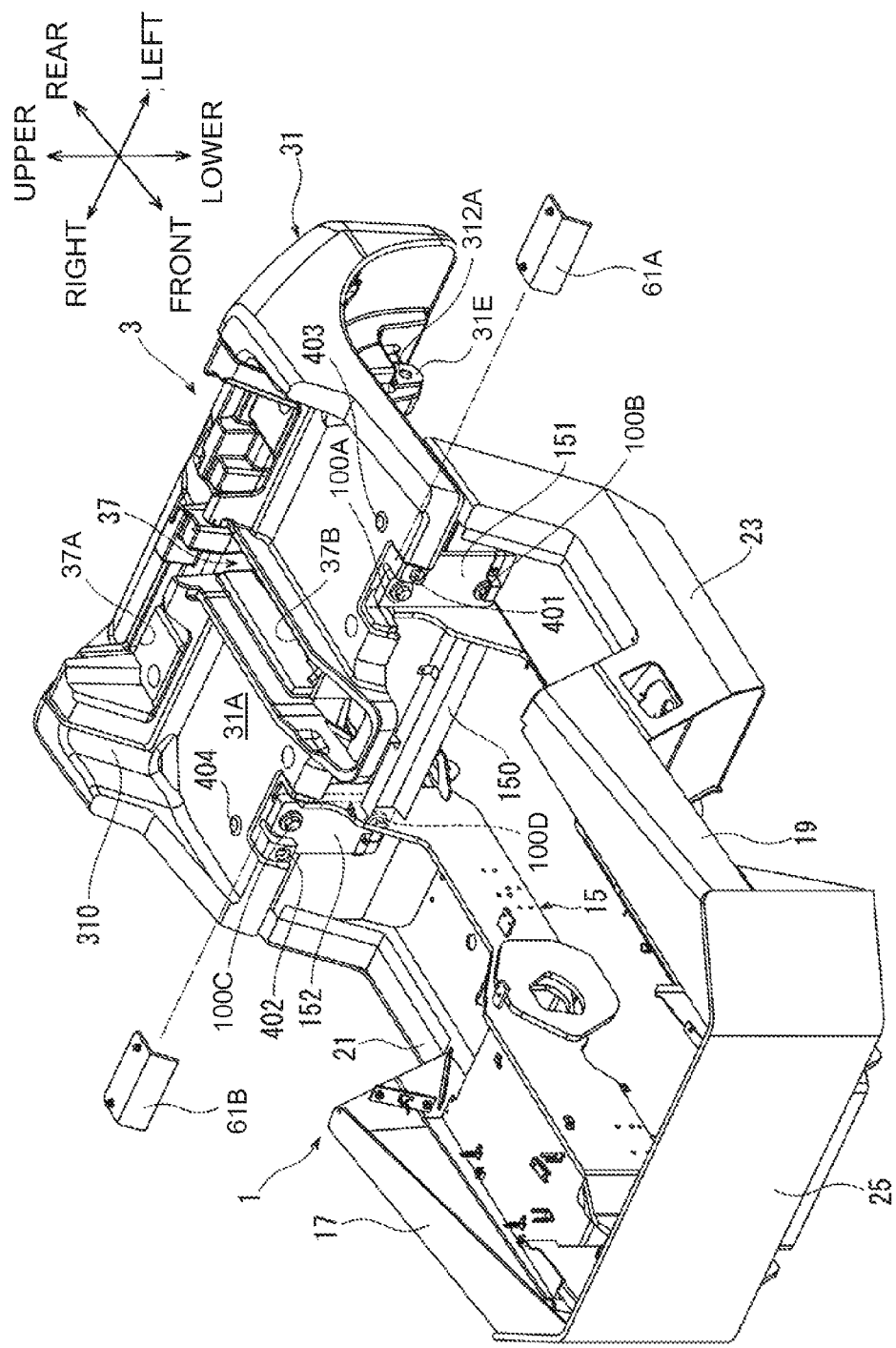
FIG. 4 is a perspective view of the industrial vehicle of FIG. 1, showing a counterweight connected to the frame.

As shown in FIG. 4, the left vertical wall 151 and the right vertical wall 152 are formed by flat steel plates. The left vertical wall 151 is connected to a left rear part of the frame body 150, and the right vertical wall 152 is connected to a right rear part of the frame body 150. The left vertical wall 151 and the right vertical wall 152 extend upward beyond the frame 15.

Referring to FIG. 2, the right fender panel 17 is assembled to a right front part of the frame body 150. The left fender panel 19 is assembled to a left front part of the frame body 150. The fuel tank 21 is assembled to the right side of the frame body 150 at a position rearward of the right fender panel 17. The side panel 23 is assembled to the left side of the frame body 150 at a position rearward of the left fender panel 19. The front guard 25 is assembled to the front end of the frame body 150. As shown in FIG. 1, the hood 27 is assembled between the right fender panel 17 and the left fender panel 19. The center panel 28 and the floor panel 29 are assembled between the fuel tank 21 and the side panel 23.

The right and left front wheels 7 are disposed below the right fender panel 17 and the left fender panel 19, respectively, and supported by the frame body 150.

The counterweight 3 includes a counterweight body 31 (FIG. 5) and a first cover 33, and a second cover 35 (FIG. 3).

Figure 5:
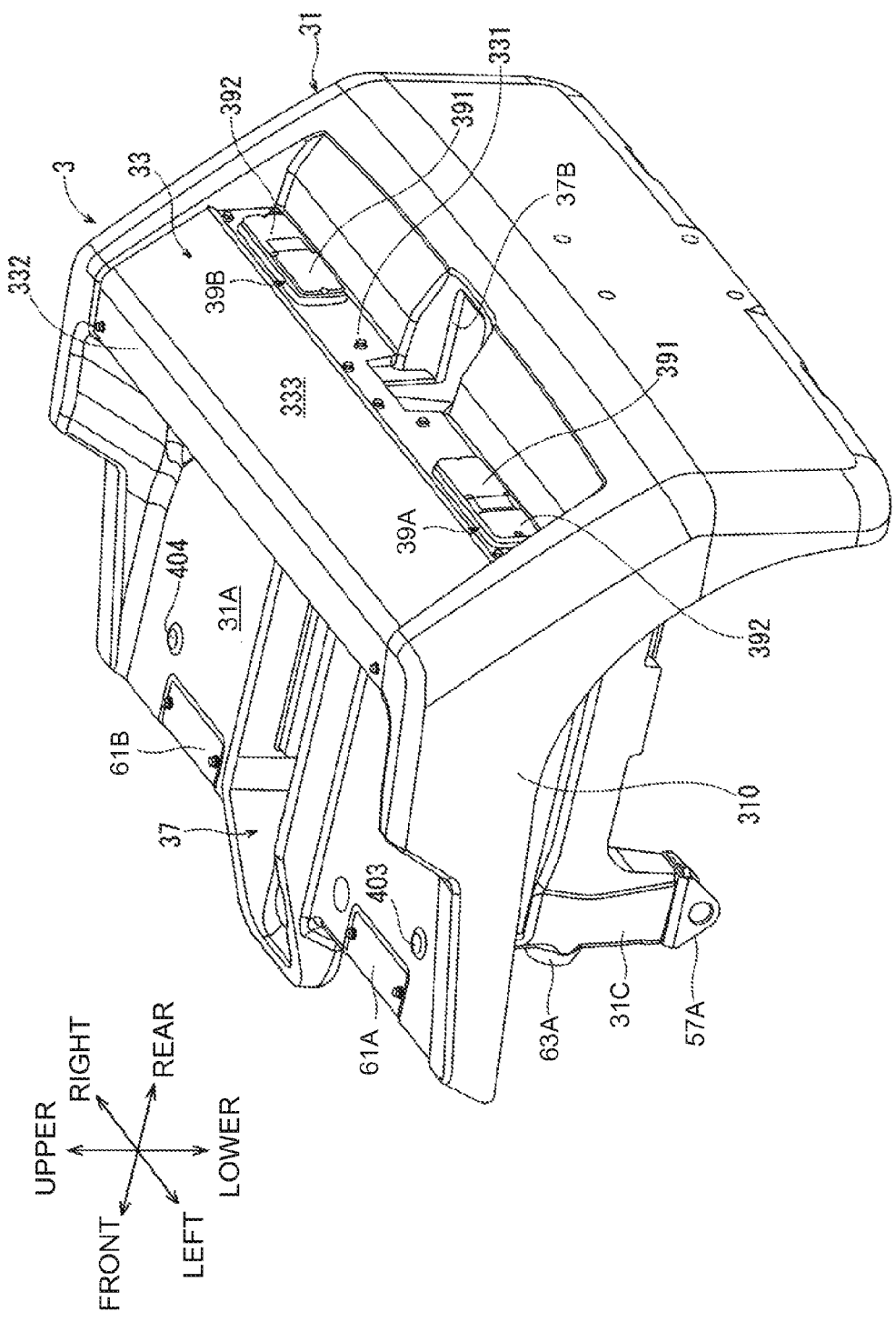
FIG. 5 is a rear perspective view of the counterweight of the industrial vehicle of FIG. 1.

As shown in FIG. 5, the counterweight body 31 is an integrated member formed by casting. The counterweight body 31 has at a rear part thereof a curved portion 310 that extends upward. The rear part of the curved portion 310 is formed inclined downwardly rearward.

Figure 6:
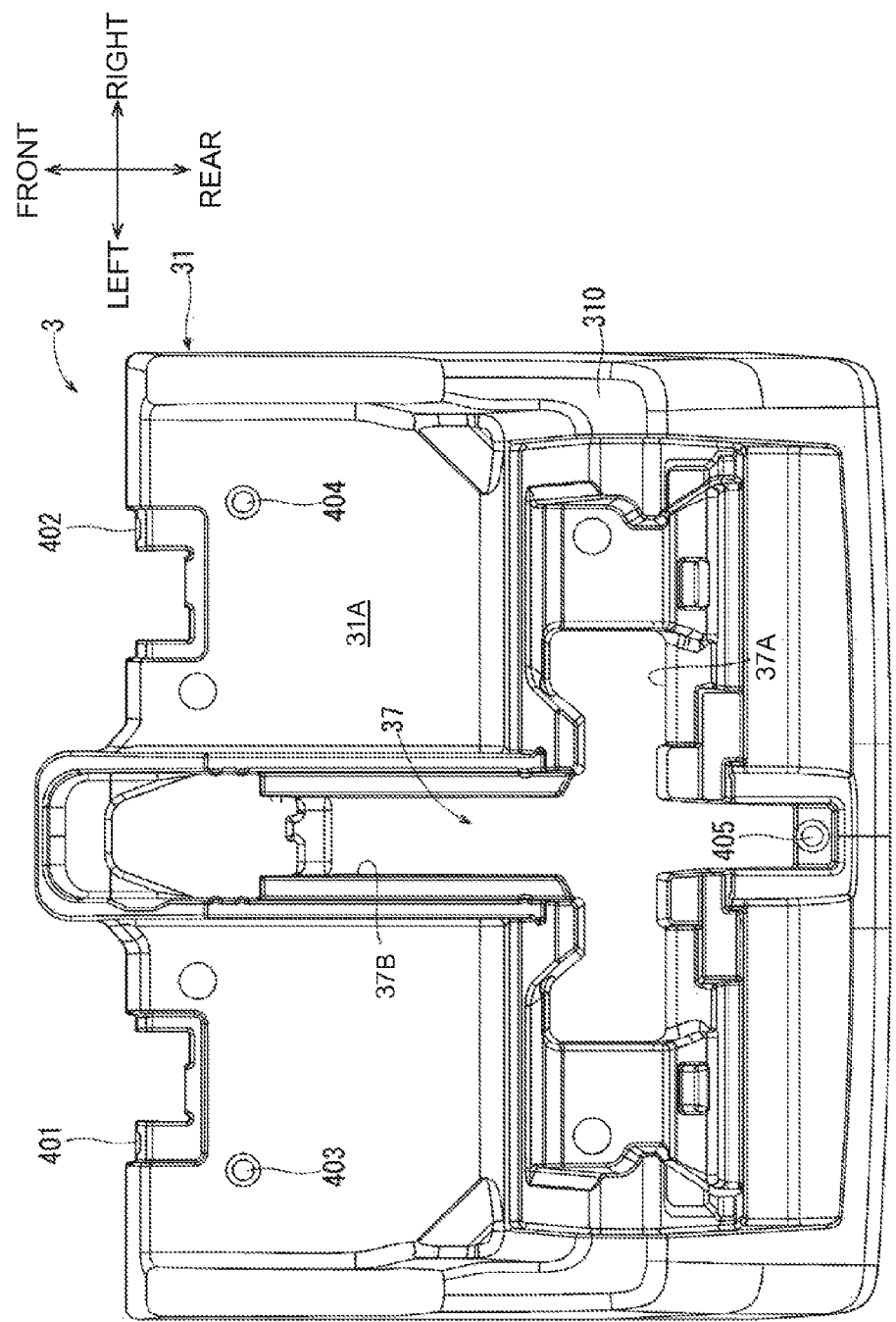
FIG. 6 is a top view of the counterweight of the industrial vehicle of FIG. 1.

As shown in FIG. 6, the counterweight body 31 has an opening 37 that extends in the vertical direction of the vehicle body 1. The opening 37 includes a center portion 37A extending in the lateral direction in the curved portion 310 and a linear portion 37B extending linearly across the center portion 37A and longitudinally from the rear end to the front end of the counterweight body 31, forming substantially a criss-cross shape. It is to be noted that the shape of the opening 37 may be modified as appropriate.

Figure 7:
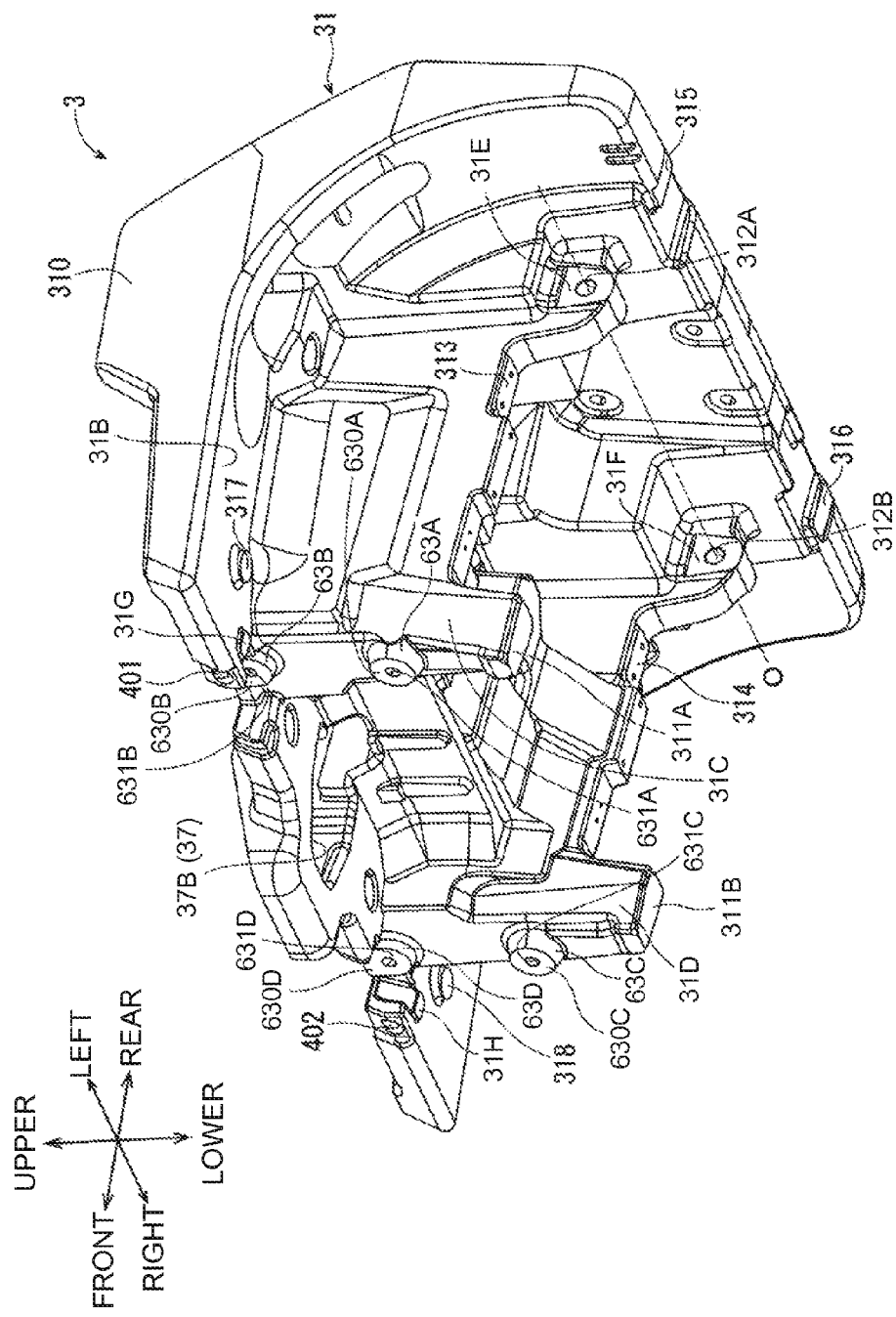
FIG. 7 is a perspective view of the counterweight of the industrial vehicle of FIG. 1.

The counterweight body 31 further has first to fifth reference portions 401 to 405. The first to fifth reference portions 401 to 405 are cast directly in the surface of the counterweight body 31. As shown in FIG. 7, the first reference portion 401 is formed at the left front end of the counterweight body 31 and the second reference portion 402 is formed at the right front end of the counterweight body 31, respectively. The first reference portion 401 and the second reference portion 402 are disposed symmetrical to each other with respect to the longitudinal center of the vehicle body 1 and at the same height in the vertical direction of the counterweight body 31.

As shown in FIG. 6, the third reference portion 403 is formed in an upper surface of the counterweight body 31 rearward of the first reference portion 401. The fourth reference portion 404 is formed in the upper surface of the counterweight body 31 rearward of the second reference portion 402. The first reference portion 401 and the second reference portion 402 are disposed symmetrical to each with respect to the longitudinal center of the vehicle body 1 and at the same height in the vertical direction of the counterweight body 31. The fifth reference portion 405 is formed at the rear end of the linear portion 37B of the opening 37. The fifth reference portion 405 is disposed at a position that is different from that of the third reference portion 403 and the fourth reference portion 404 in the vertical direction of the counterweight body 31.

As shown in FIG. 7, the counterweight body 31 has at the front left lower part thereof a left leg portion 31C extending downward from the lower surface 31B of the counterweight body 31 and at the front right lower part thereof a right leg portion 31D extending downward from the lower surface 31B. The left leg portion 31C has at the bottom end thereof a planar left bottom end surface 311A and the right leg portion 31D has at the bottom end thereof a planar right bottom end surface 311B, respectively. The left bottom end surface 311A and the right bottom end surface 311B are disposed symmetrical to each other with respect to the longitudinal center of the counterweight body 31 and at the same height in the vertical direction of the counterweight body 31.

The left leg portion 31C has first and second projections 63A, 63B each projecting frontward. The first projection 63A is disposed substantially at the middle of the left leg portion 31C in the vertical direction. The second projection 63B is disposed at the upper end of the left leg portion 31C. The first projection 63A has at the front end thereof a planar first contact surface 630A. The second projection 63B has at the front end thereof a planar second contact surface 630B.

Similar to the left leg portion 31C, the right leg portion 31D includes third and fourth projections 63C, 63D each projecting frontward. The third projection 63C is disposed substantially at the middle of the right leg portion 31D in the vertical direction. The fourth projection 63D is disposed at the upper end of the right leg portion 31D. The third projection 63C has at the front end thereof a planar third contact surface 630C, and the fourth projection 63D has at the front end thereof a planar fourth contact surface 630D, respectively. The first to fourth projections 63A to 63D have bolt holes 631A to 631D, respectively to receive therethrough bolts 100A to 100D, which will be described later.

The first contact surface 630A and the third contact surface 630C are disposed symmetrical to each other with respect to the longitudinal center of the counterweight body 31 and at the same height in the vertical direction of the counterweight body 31. Similarly, the second contact surface 630B and the fourth contact surface 630D are disposed symmetrical to each other with respect to the longitudinal center of the counterweight body 31 and at the same height in the vertical direction of the counterweight body 31.

A planar first mounting portion 31E is formed at the rear left lower part of the counterweight body 31, and a planar second mounting portion 31F is formed at the rear right lower part of the counterweight body 31. The first and the second mounting portions 31E, 31F correspond to the mounting portion of the present invention. The first mounting portion 31E and the second mounting portion 31F are disposed symmetrical to each other with respect to the longitudinal center of the counterweight body 31 and at the same height in the vertical direction of the counterweight body 31.

The first mounting portion 31E has therethrough a first mounting hole 312A that extends in the direction of axis O. The second mounting portion 31F has therethrough a second mounting hole 312B that extends coaxially with the first mounting hole 312A as indicated by the axis O.

The counterweight body 31 has in a left lower part thereof a first damper mounting surface 313 and in a right lower part thereof a second damper mounting surface 314, respectively. The first damper mounting surface 313 and the second damper mounting surface 314 are disposed symmetrical to each other with respect to the longitudinal center of the counterweight body 31 and at the same height in the vertical direction of the counterweight body 31.

The counterweight body 31 has at the rear end thereof first and second mounting surfaces 315, 316. The first mounting surface 315 is formed in the left part of the counterweight body 31, and the second mounting surface 316 is formed in the right part of the counterweight body 31. The first mounting surface 315 and the second mounting surface 316 are disposed symmetrically to each other with respect to the longitudinal center of the counterweight body 31 and at the same height in the vertical direction of the counterweight body 31. It is to be noted that the height of the first and the second mounting surfaces 315, 316 in the vertical direction of the counterweight body 31 and the height of the left bottom end surface 311A and the right bottom end surface 311B in the vertical direction of the counterweight body 31 are different from each other.

First and second planar contact portions 31G, 31H and third and fourth mounting surfaces 317, 318 are formed in the lower surface 31B of the counterweight body 31, respectively. The first contact portion 31G is disposed in the left part of the counterweight body 31, and the second contact portion 31H is disposed in the right part of the counterweight body 31. The third mounting surface 317 is formed rearward of the first contact portion 31G in the left part of the counterweight body 31, and the fourth mounting surface 318 is formed rearward of the second contact portion 31H in the right part of the counterweight body 31, respectively.

The left lower bottom end surface 311A, the right lower bottom end surface 311B, the first to fourth contact surfaces 630A to 630D, the first and second mounting portions 31E, 31F, the first and second mounting holes 312A, 312B, the first and second damper mounting surfaces 313, 134, the first to fourth mounting surfaces 315 to 318, and the first and second contact portions 31G, 31H are formed by machining the appropriate surface of the counterweight body 31 that is formed by casting, which procedure will be described in the following.

First, a work in process for the counterweight body 31 that is yet to be finished is placed on a jig (not shown). In this case, the work is positioned in the longitudinal direction relative to the jig with reference to the first and second reference portions 401, 402 shown in FIG. 7. Next, the work is positioned in the vertical direction relative to the jig with reference to the third to fifth reference portions 403 to 405 shown in FIG. 6. Positioning of the work in the width direction relative to the jig is to be adjusted by the jig. Positioning of the work in the longitudinal direction, the width direction, and the vertical direction is thus accomplished. Subsequently, with the work set on the jig, the first and second mounting holes 312A, 312B and other portions are formed by machining.

Subsequently, machining is provided on the surface of the counterweight body 31. For the surface machining, the work is placed on a jig (not shown) in the same way. Specifically, the work is positioned in the longitudinal direction relative to the jig with reference to the second contact surface 630B of the left leg portion 31C and the fourth contact surface 630D of the right leg portion 31D. Then, the work is positioned in the vertical direction relative to the jig with reference to the first mounting surface 315, the second mounting surface 316, the left lower bottom end surface 311A, and the right lower bottom end surface 311B. Furthermore, the work is positioned in the width direction relative to the jig with reference to the first and second mounting portions 31E, 31F. The machining is performed on the surface of the work thus positioned in the lateral and longitudinal directions.

After the machining is provided on the surface of the work, a bracket 57A (FIG. 8) is fixed to the left lower bottom end surface 311A by bolts. A bracket 57B (FIG. 8) is fixed to the right lower bottom end surface 311B by bolts (FIG. 7) in the same manner as the bracket 57A.

The first cover 33 shown in FIG. 5 is formed by pressing a metal plate. The first cover 33 includes a vertical surface 331 that is a lower portion of the first cover 33 and extends substantially perpendicularly in the vertical direction, a horizontal surface 332 that is an upper portion of the first cover 33 and extends substantially horizontally in the longitudinal direction, and a connecting surface 333 that connects the vertical surface 331 and the horizontal surface 332. The connecting surface 333 is formed inclined downward along the rear part of the curved portion 310 from the horizontal surface 332 toward the vertical surface 331.

Tail lamps 39A, 39B are mounted to the left and the right of the vertical surface 331, respectively. The tail lamps 39A, 39B are combinations of a brake lamp 391 and a direction indicator lamp 392, respectively.

The second cover 35 shown in FIG. 3 is also formed by pressing a metal plate. The second cover 35 is formed flat extending laterally. It is to be noted that the shapes of the first and second covers 33, 35 may appropriately be changed according to the shape of the work of the counterweight body 31. The first and second covers 33, 35 may be made of a resin.

As shown in FIG. 5, the first cover 33 is mounted to the rear part of the curved portion 310 of the counterweight body 31 by a plurality of bolts. The second cover 35 is mounted to the front part of the curved portion 310 by a plurality of bolts (see FIG. 1). The first cover 33 and the second cover 35 cooperate to form an outline of the curved portion 310 and cover the center portion 37A of the opening 37. As shown in FIG. 5, the rear end of the linear portion 37B of the opening 37 is exposed to the outside when the first cover 33 and the second cover 35 are mounted to the counterweight body 31. The first cover 33 is mounted to the rear part of the curved portion 310. Therefore, the tail lamps 39A, 39B are located in the rear of the counterweight 3.

As shown in FIG. 4, the counterweight body 31 is fastened to the left vertical wall 151 and the right vertical wall 152 by bolts 100A to 100D. In this case, the first contact portion 31G (FIG. 7) is brought into contact with the upper end surface of the left vertical wall 151, and the second contact portion 31H is brought into contact with the upper end surface of the right vertical wall 152, respectively, thus the counterweight body 31 being positioned properly relative to the left vertical wall 151 and the right vertical wall 152. Then, the first and second contact surfaces 630A, 630B are brought into contact with the left vertical wall 151, and the third and fourth contact surface 630C, 630D are brought into contact with the right vertical wall 152, respectively.

When fastening the counterweight body 31 to the left vertical wall 151 and the right vertical wall 152, the counterweight body 31 is placed on a jig (not shown). Specifically, the counterweight body 31 is placed on the jig while positioning the counterweight body 31 relative to the jig with reference to the first to fourth mounting surfaces 315 to 318 shown in FIG. 7. By fastening the left vertical wall 151 and the right vertical wall 152 to the counterweight body 31, the counterweight 3 is connected to the rear of the frame 15 of the vehicle body 1.

Figure 8:
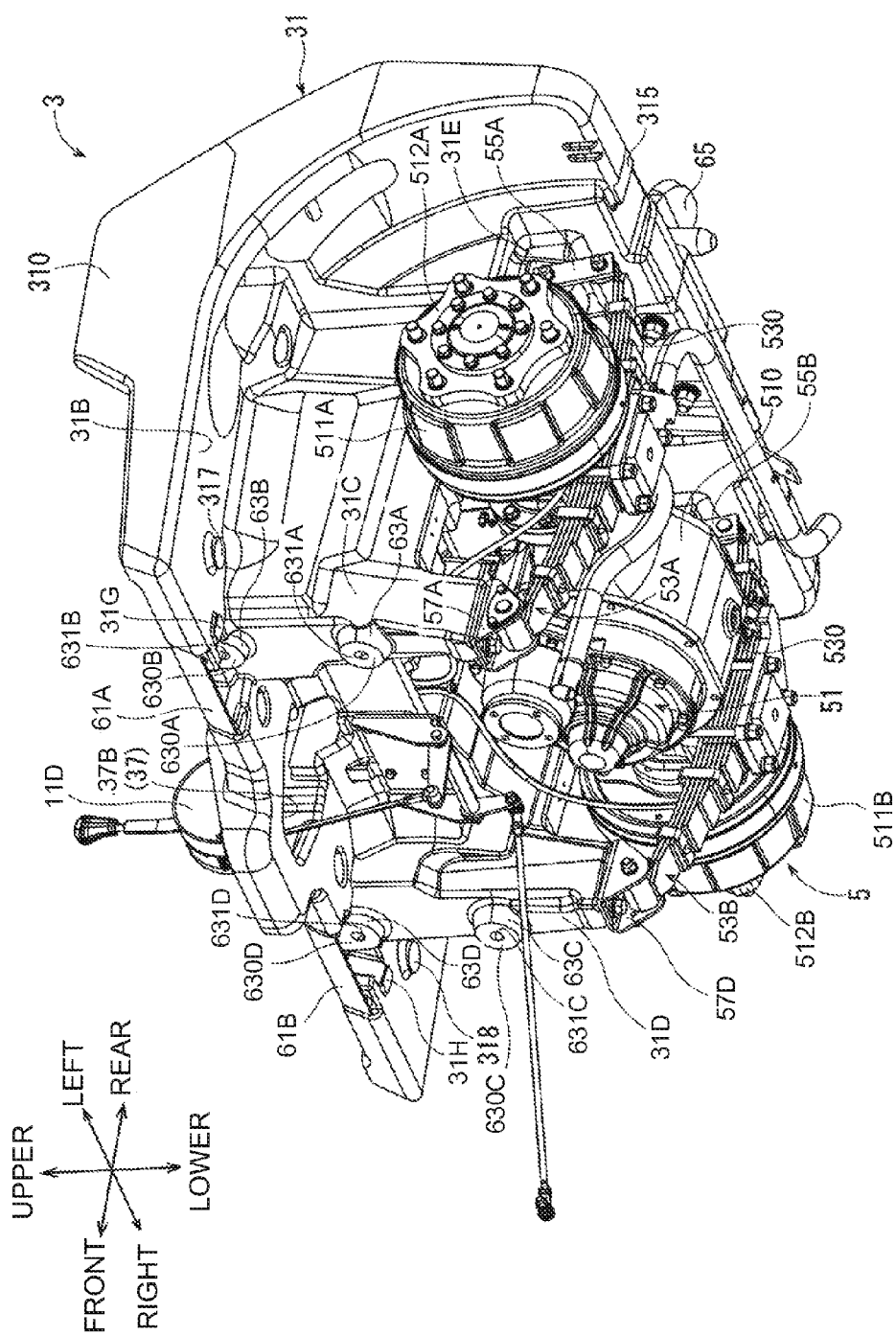
FIG. 8 is a perspective view of the industrial vehicle of FIG. 1, showing a drive device mounted to the counterweight.

As shown in FIG. 4, a first bolt cover 61A is mounted to the left front end of the counterweight body 31 and a second bolt cover 61B is attached to the right front end of the counterweight body 31, respectively. The first bolt cover 61A conceals the bolt 100A and the first reference portion 401 and the second bolt cover 61B conceals the bolt 100C and the second reference portion 402, respectively. As shown in FIG. 2, the seat 13 is disposed in the left front part of the counterweight body 31. As shown in FIG. 8, a drawbar device 65 that connects the towing tractor and a cart is provided at the lower rear end of the counterweight body 31. It is to be noted that the drawbar 65 is not illustrated in FIG. 5 and other drawings.

As shown in FIG. 3, the drive device 5 includes a rear axle 51, a leaf spring suspensions 53A, 53B provided as the damping members of the present invention on the right and left sides of the rear axle 51. The rear axle 51 corresponds to the drive device body of the present invention.

The rear axle 51 includes an axle case 510, a differential gear and an axle shaft (that are not shown) housed in the axle case 510, a pair of drum brakes 511A, 511B provided at the right and left ends of the axle shaft, respectively, hubs 512A, 512B, and a pair of left and dampers 513A, 513B.

The rear axle 51 is connected to the engine and the transmission so that motive power of the engine is transmitted to the rear axle 51 through the transmission. The rear wheels 9 are connected to the rear axle 51 through the hubs 512A, 512B, respectively, so that the rear axle 51 drives the rear wheels 9 to thereby cause the towing tractor to travel. The leaf spring suspensions 53A, 53B allow relative motion between the counterweight 3 and the rear wheels 9 to absorb the vibration caused by traveling of the towing tractor.

As shown in FIG. 8, each of the leaf spring suspensions 53A and 53B includes a leaf spring 530 that is formed of laminated leaf springs. The leaf spring suspensions 53A, 53B are disposed extending in the longitudinal direction of the vehicle body. The leaf spring suspensions 53A, 53B are mounted to the counterweight body 31 at the right and left lower sides thereof.

Specifically, the leaf spring suspension 53A is attached at the rear end thereof to a first mounting hole 312A through a bracket 55A to thereby mount the rear end of the leaf spring suspension 53A to the first mounting portion 31E. The front end of the leaf spring suspension 53A is mounted to the left leg portion 31C of the counterweight body 31 through the bracket 57A.

The leaf spring suspension 53B is mounted to a second mounting hole 312B (FIG. 7) through the bracket 55B (FIG. 8) to thereby mount the rear end of the leaf spring suspension 53B to a second mounting portion 31F. The front end of the leaf spring suspension 53B is mounted to the right leg portion 31D of the counterweight 31 through the bracket 57B.

Figure 9:
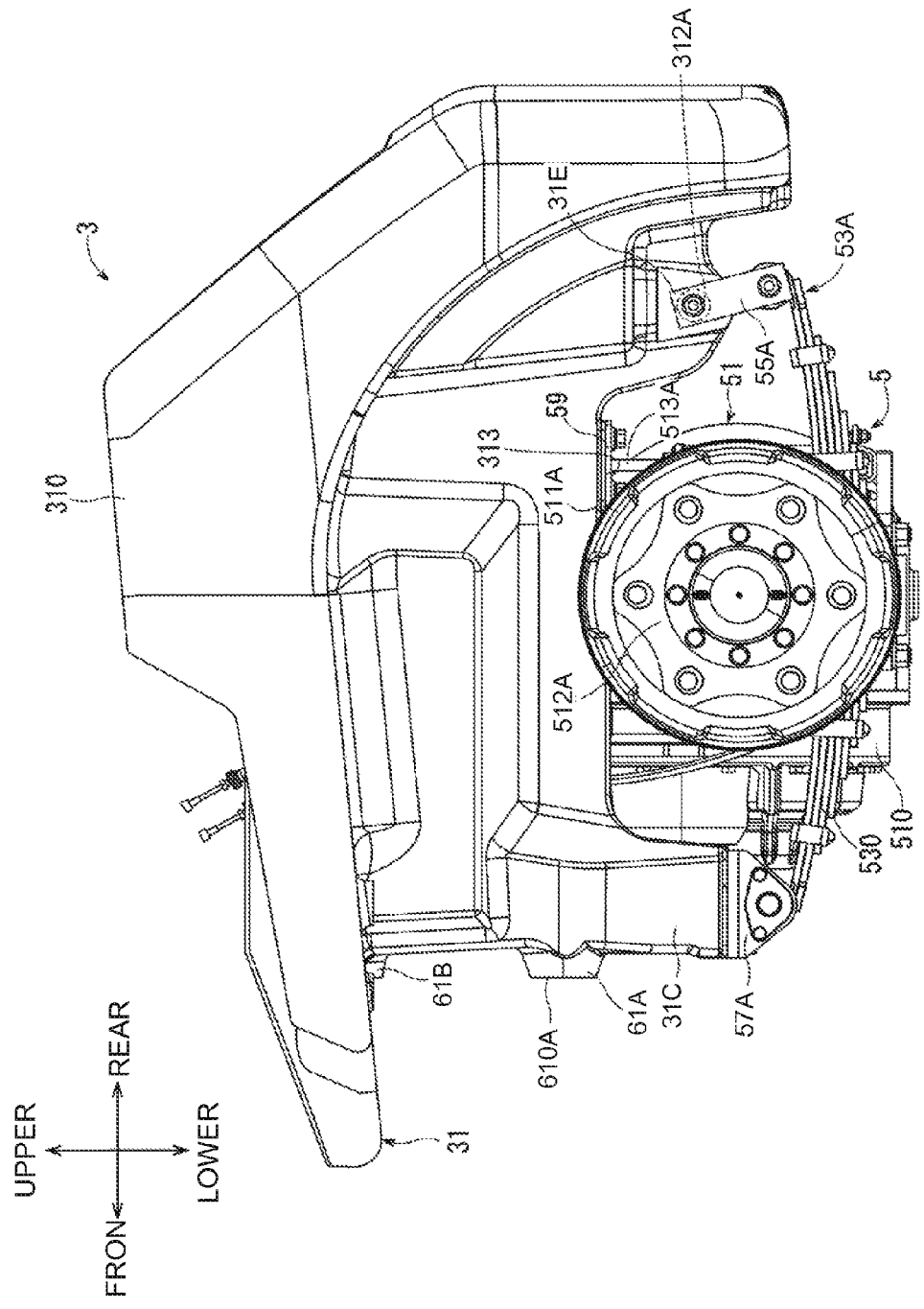
FIG. 9 is a left side view of the industrial vehicle of FIG. 1, showing the drive device mounted to the counterweight.

As described above, the first and second mounting holes 312A, 312B are formed in the counterweight body 31 to be coaxial with each other. Therefore, as shown in FIG. 8, the rear ends of the leaf spring suspensions 53A, 53B are mounted so that the leaf spring suspensions 53A, 53B are coaxial with the counterweight body 31. As shown in FIG. 9, the left damper 513A is mounted on a first damper mounting surface 313 through a bracket 59. The right damper 513B (FIG. 3) is mounted to the second damper mounting surface 314 (FIG. 7) through a bracket that is not shown in the drawing. According to the towing tractor of the present invention, the drive device 5 is mounted below the counterweight body 31 or directly to the counterweight 3 through the leaf spring suspensions 53A, 53B.

Referring now to FIG. 1, the operation unit 11 includes an instrumental panel 11A, a steering wheel 11B, a drawbar lever 11C, and an operation lever unit 11D that is shown in FIG. 3. As shown in FIG. 1, the instrumental panel 11A and the steering wheel 11B are installed in the vehicle body 1. The drawbar lever 11C is operatively connected to the drawbar device 65 disposed at a rear position of the counterweight body 31. The operation lever unit 11D shown in FIG. 3 is disposed on the right of the seat 13 fixed to the counterweight body 31. As shown in FIG. 8, the front end of the linear portion 37B of the opening 37 is covered by the operation lever unit 11D.

In the towing tractor according to the above-described embodiment in which the drive device 5 is mounted to the counterweight body 31 through the leaf spring suspensions 53A, 53B at a position under the counterweight body 31, the counterweight body 31 serves as a part of the frame 15 and therefore, there is no need of mounting the drive device 5 to the frame body 150, with the result that the structure of the frame 15 can be simplified and the manufacturing cost of the towing tractor can be reduced, accordingly.

The towing tractor according to the present embodiment, the counterweight body 31 has a pair of first and second mounting portions 31E and 31F each having the first and second mounting holes 312A and 312B, respectively. The counterweight body 31 further has on the bottom surface 31B thereof the left bottom end surface 311A, the right bottom end surface 311B, the first to fourth contact surfaces 630A to 630D, the first and second damper mounting surfaces 313, 314, and the first and second contact portions 31G, 31H. The first and second mounting portions 31E, 31F and the afore-mentioned other parts are formed by machining the appropriate parts of the cast work for the counterweight body 31. The first and second mounting holes 312A, 312B are coaxial with each other.

In the towing tractor of the present embodiment, therefore, it is not necessary to weld mountings such as the first and second mounting portions 31E, 31F to the rear lower part of the counterweight body 31 for mounting the rear ends of the leaf spring suspensions 53A, 53B to the counterweight body 31. As a result, the first and second mounting holes 312A, 312B may be formed with highly accurate coaxiality so that the rear ends of the leaf spring suspensions 53A, 53B may be mounted to the counterweight body 31 easily and with high accuracy.

Furthermore, the left bottom end surface 311A and the right bottom end surface 311B are formed flat by machining, and therefore, the brackets 57A, 57B can be attached to the lower bottom end surface 311A and the lower bottom end surface 311B, respectively by bolts. Therefore, the front ends of the leaf spring suspensions 53A, 53B can preferably be attached to the left leg portion 31C and the right leg portion 31D, respectively. Accordingly, in the towing tractor of the present embodiment, it is possible to mount the leaf spring suspensions 53A, 53B to the counterweight body 31 highly accurately.

According to the towing tractor of the present embodiment in which the first and second mounting surfaces 313, 314 are also formed by machining, the left damper 513A and the right damper 513B can be mounted properly to the first damper mounting surface 313 and the second damper mounting surface 314, respectively.

Therefore, the towing tractor according to the present embodiment permits mounting of the drive device 5 to the counterweight body 31 with high accuracy and is easier to manufacture.

This provision of the first to fifth reference portions 401 to 405 that are cast directly in the surface of the counterweight body 31 of the towing tractor and used in positioning of the counterweight body 31 relative to the jig permits accurate and easy positioning of the work for the counterweight body 31 in machining the work. Therefore, the formation of the first and second mounting holes 312A, 312B and other related portions at appropriate positions by machining may be accomplished with high accuracy.

In machining the surfaces of the work for the counterweight body 31, the work is positioned easily and accurately relative to the jig because machined portions such as the second and fourth contact surfaces 630B, 630D, the first and second mounting surfaces 315, 316, the left bottom end surface 311A, the right bottom end surface 311B, and the first and second mounting portions 31E, 31F are used as the reference positions, with the result that surface machining of the work is performed with high accuracy.

Furthermore, in fastening the counterweight body 31 to the left vertical wall 151 and the right vertical wall 152 of the frame body 150, the counterweight body 31 is positioned relative to the jig with reference to the machines first to fourth mounting surfaces 315 to 318. This permits easy and highly accurate positioning of the counterweight body 31 relative to the jig. Therefore, the counterweight body 31 is positioned relative to the left vertical wall 151 and the right vertical wall 152, enabling fastening of the counterweight body 31 to the left vertical wall 151 and the right vertical wall 152 accurately.

In fastening the counterweight body 31 to the left vertical wall 151 and the right vertical wall 152 of the frame body 150, the first to fourth contact surfaces 630A to 630D and the first and second contact portions 31G, 31H that are formed by machining may be used for positioning of the counterweight body 31 relative to the frame body 150 by allowing the first to fourth contact surfaces 630A to 630D and the first and second contact portions 31G, 31H to be in contact with the left vertical wall 151 and the right vertical wall 152. This facilitates fastening of the counterweight body 31 to the left vertical wall 151 and the right vertical wall 152 of the frame body 150 with bolts 100A to 100D.

Furthermore, the leaf spring suspensions 53A, 53B used as the damping member in the towing tractor according to the present embodiment are simple in the structure and hence easy to be mounted to the counterweight body 31, and the towing tractor using such leaf spring suspensions 53A, 53B is easy to manufacture.

Although the specific embodiment has been described, the present invention is not limited thereto, and the invention may appropriately be modified within the gist of the present invention.

Although the towing tractor has been described as the industrial vehicle of the present invention, the industrial vehicle includes a forklift truck.

The counterweight body 31 may be formed of a combination of a plurality of components.

The damping members including a coil spring and a shock absorber may be used as an alternative to the leaf spring suspensions 53A, 53B. Furthermore, the damping members may be mounted to the first and second mounting portions 31E, 31F directly without using the brackets 55A, 55B.

The present invention is applicable to an industrial vehicle such as a towing tractor and a forklift truck.

What is claimed is:

1. An industrial vehicle comprising:
a frame;
a casting made counterweight that is connected to a rear part of the frame; and
a drive device that drives rear wheels, wherein
the drive device includes a drive device body and a pair of damping members that is mounted to the counterweight on right and left sides of the drive device body and allows relative motion between the counterweight and the rear wheels,
the counterweight has
a first mounting hole and a second mounting hole through which rear ends of the pair of respective damping members are mounted to the counterweight, wherein the first mounting hole and the second mounting hole are formed coaxially with each other and are respectively disposed on a left mounting portion and right mounting portion of the counterweight, wherein the left mounting portion and the right mounting portion are formed as a single integral member.

2. The industrial vehicle according to claim 1, wherein each damping member is a leaf spring suspension having a leaf spring.

* * * * *